(12) United States Patent
Rakhmailov

(10) Patent No.: US 6,460,324 B1
(45) Date of Patent: Oct. 8, 2002

(54) GAS TURBINE ENGINE

(75) Inventor: Anatoly Rakhmailov, Bataysk (RU)

(73) Assignee: ALM Development, Inc., Washington, DC (US)

( * ) Notice: Subject to any disclaimer, the term of this patent is extended or adjusted under 35 U.S.C. 154(b) by 0 days.

(21) Appl. No.: 09/632,564

(22) Filed: Aug. 4, 2000

Related U.S. Application Data

(60) Provisional application No. 60/158,935, filed on Oct. 12, 1999, provisional application No. 60/158,934, filed on Oct. 12, 1999, provisional application No. 60/158,929, filed on Oct. 12, 1999, provisional application No. 60/159,066, filed on Oct. 12, 1999, and provisional application No. 60/159,065, filed on Oct. 12, 1999.

(51) Int. Cl.[7] .............................. F02C 3/10; F02C 3/34; F02C 7/10; F02C 7/00
(52) U.S. Cl. ................ 60/39.162; 60/39.41; 60/39.511; 60/726
(58) Field of Search .................. 60/39.03, 39.04, 60/39.162, 39.41, 39.511, 726, 773, 774

(56) References Cited

U.S. PATENT DOCUMENTS

| | | |
|---|---|---|
| 1,388,707 A | 8/1921 | Heinze |
| 1,732,234 A | 10/1929 | Jensky |
| 1,868,143 A | 7/1932 | Heinz |
| 2,303,381 A | 12/1942 | New |
| 2,410,259 A | 10/1946 | Birmann |
| 2,469,678 A * | 5/1949 | Wyman ..................... 60/39.41 |
| 2,579,049 A | 12/1951 | Price |
| 2,715,011 A | 8/1955 | Schorner |
| 2,784,551 A | 3/1957 | Karlby et al. |
| 2,821,067 A | 1/1958 | Hill |
| 2,823,520 A | 2/1958 | Spalding |
| 3,034,298 A | 5/1962 | White |
| 3,209,536 A | 10/1965 | Howes et al. |
| 3,280,555 A | 10/1966 | Charpentier et al. |
| 3,287,904 A | 11/1966 | Warren et al. |
| 3,369,361 A * | 2/1968 | Craig ......................... 60/39.41 |
| 3,469,396 A | 9/1969 | Onishi et al. |
| 5,762,156 A | 6/1970 | Bates et al. |
| 3,625,003 A | 9/1970 | Liddle et al. |
| 3,703,808 A | 11/1972 | Stearns |
| 3,727,401 A | 4/1973 | Fincher |
| 3,751,911 A | 8/1973 | Tartaglia |
| 3,775,974 A | 12/1973 | Silver |
| 3,826,084 A | 6/1974 | Branstrom et al. |
| 3,883,263 A | 5/1975 | Mai |
| 3,886,732 A | 6/1975 | Gamell |
| 3,971,209 A | 7/1976 | de Chair |
| 4,003,199 A | 1/1977 | Bell, III et al. |
| 4,022,544 A | 5/1977 | Garkusa |
| 4,024,705 A | 5/1977 | Hedrick |
| 4,084,922 A | 4/1978 | Glenn |
| 4,142,836 A | 3/1979 | Glenn |
| 4,193,568 A | 3/1980 | Heuvel |
| 4,213,297 A | 7/1980 | Foster et al. |
| 4,277,938 A | 7/1981 | Belke et al. |
| 4,311,431 A | 1/1982 | Barbeau |
| 4,338,780 A | 7/1982 | Sakamoto et al. |

(List continued on next page.)

FOREIGN PATENT DOCUMENTS

| | | |
|---|---|---|
| DE | 2332698 | 1/1974 |
| DE | 2335594 | 8/1974 |
| DE | 2437990 | 2/1976 |
| DE | 3713923 | 11/1987 |
| DE | 3835932 | 4/1990 |
| DE | 2018641 | 10/1991 |

(List continued on next page.)

Primary Examiner—Ted Kim
(74) Attorney, Agent, or Firm—Hughes Hubbard & Reed LLP; Ronald Abramson; Sheryl L. Sandridge

(57) ABSTRACT

A gas turbine engine comprising a compressor, a power turbine, a counter-rotating compressor turbine for powering the compressor and a heat exchanger interconnected among them, uses a mixer to mix waste fluid heated by the heat exchanger with combustion air and feed the mixture to a combustor.

12 Claims, 5 Drawing Sheets

U.S. PATENT DOCUMENTS

| | | | |
|---|---|---|---|
| 4,338,781 A | | 7/1982 | Belke et al. |
| 4,370,094 A | | 1/1983 | Ambrosch et al. |
| 4,501,053 A | | 2/1985 | Craig et al. |
| 4,502,277 A | * | 3/1985 | Papastavros ............... 60/39.41 |
| 4,522,557 A | | 6/1985 | Bouiller et al. |
| 4,549,402 A | | 10/1985 | Saintsbury et al. |
| 4,641,495 A | * | 2/1987 | Mowill ..................... 60/726 |
| 4,791,784 A | | 12/1988 | Minardi et al. |
| 4,817,858 A | | 4/1989 | Verpoort |
| 4,991,391 A | | 2/1991 | Kosinski |
| 5,054,279 A | | 10/1991 | Hines |
| 5,123,242 A | | 6/1992 | Miller |
| 5,148,670 A | * | 9/1992 | Birch et al. ............... 60/39.41 |
| 5,201,796 A | | 4/1993 | Glinski et al. |
| 5,232,335 A | | 8/1993 | Narayana et al. |
| 5,269,133 A | | 12/1993 | Wallace |
| 5,406,796 A | | 4/1995 | Hiereth et al. |
| 5,473,881 A | | 12/1995 | Kramnik et al. |
| 6,050,095 A | | 4/2000 | Blake |
| 6,145,296 A | * | 11/2000 | Rakhmailov ............ 60/39.162 |
| 6,212,871 B1 | * | 4/2001 | Rakhmailov ............ 60/39.162 |

FOREIGN PATENT DOCUMENTS

| | | |
|---|---|---|
| DE | 4331779 | 3/1995 |
| EP | 0103370 | 3/1984 |
| FR | 1163559 | 9/1958 |
| FR | 1166419 | 11/1958 |
| FR | 2385899 | 10/1998 |
| GB | 196452 | 4/1923 |
| GB | 412970 | 7/1934 |
| GB | 413697 | 7/1934 |
| GB | 720436 | 12/1954 |
| GB | 753652 | 7/1956 |
| GB | 801281 | 9/1958 |
| GB | 803994 | 11/1958 |
| GB | 1435687 | 5/1976 |
| JP | 11159345 | 6/1999 |
| RU | 1774290 | 6/1992 |
| RU | 2050455 | 12/1995 |
| RU | 2052145 | 1/1996 |
| WO | WO 9505063 | 2/1995 |

* cited by examiner

GAS TURBINE ENGINE

This application claims the benefit of U.S. provisional patent application No. 60/158,935, filed Oct. 12, 1999, and cross-references nine U.S. patent applications, Ser. Nos. 09/161,104, 09/161,114, 09/161,115 now U.S. Pat. No. 6,305,157 and Ser. No. 09/161,170 now U.S. Pat. No. 6,145,296, all of which were filed on Sep. 25, 1998, and Ser. Nos. 09/267,893, 09/267,894, 09/267,895 now U.S. Pat. No. 6,189,311, Ser. No. 09/267,896 now U.S. Pat. No. 6,272,844 and Ser. No. 09/267,897 now U.S. Pat. No. 6,212,871 all of which were filed on Mar. 11, 1999, and also four co-pending U.S. provisional patent applications, Serial Nos. 60/159,066, 60/159,065, 60/158,934, and 60/158,929, all of which were filed on Oct. 12, 1999. Each of the above is incorporated by reference herein.

The invention relates to the field of gas turbine engines, and more specifically, to gas turbines maintaining control of fluid density to control system operation and to minimize losses.

BACKGROUND OF THE INVENTION

In conventional gas turbine engines having a turbine and a compressor, turbine output power is controlled by simply varying the fuel supply. When fuel supply is increased, the temperature upstream of the turbine increases, resulting in increased power and speed. This also causes an increase in pressure and in the expansion ratio. Controlling power in conventional gas turbine engines in this way does not pose any significant problems, but these engine are unable to accommodate sudden load changes because the temperature in the gas turbine engine changes over a very wide range: from 600° K to 1,400° K when operating from idling conditions to full load. In addition, it is not possible to "scale down" a conventional gas turbine engine to obtain a lower-power, compact engine for uses such as land vehicle applications because the turbine flow duct fluid parameters would require turbine blades to be as small as ⅛ of an inch in height. With such small blades, the engine would not produce enough torque, thus requiring a gearbox and lowering overall efficiency.

These disadvantages can be partly eliminated by reducing the pressure downstream of the turbine with an exhauster. The exhauster allows the expansion ratio to be increased and the pressure upstream of the turbine to be decreased. Turbine blades can then be made larger, and consequently produce more torque than otherwise would have been possible. This does not completely solve the problem because turbine flow duct temperature fluctuations remain. Wide temperature fluctuations result in engine components incurring large thermal expansions and contractions. These deformations result in metal-to-metal clearance variations (which gives rise to losses), lower reliability, and reduced service life.

Our co-pending application Ser. No. 09/161,114 of Sep. 25, 1998 discloses a gas turbine engine having a compressor, a power turbine and is mounted downstream of the compressor, and a compressor turbine for powering the compressor. The compressor turbine is mounted downstream of the power turbine for rotation in a direction opposite to the rotation direction of said power turbine. A heated fluid source is provided upstream of the power turbine and is connected to a fuel source. The engine has a heat exchanger for cooling the waste fluid after the compressor turbine before compression of this waste fluid in the compressor and for cooling heating the waste fluid after the compressor before feeding this compressed waste fluid to the heated fluid source. To control the power of the gas turbine engine, the density of the fluid in the flow duct of the engine is controlled by removing a part of the compressed heated waste fluid leaving the heat exchanger before the compressed waste fluid is fed to the combustor. The part of the compressed heated waste fluid that is removed into the atmosphere is replaced with combustion air which is fed to the heated fluid source. A turbocompressor unit is used to remove the waste fluid and to replace it with air for combustion.

The above-described approach controls the fluid density in the engine flow duct, thus controlling engine power. The main problem with this density control method is it incurs energy losses when part of the waste fluid is removed from the flow duct into the atmosphere. As shown in the above description of the prior art, the compressed waste fluid is heated in the heat exchanger before a part of it is removed from the flow duct. This means that a part of the heat exchanger capacity is used for heating that part of the waste fluid which will then be removed into the atmosphere. When this happens, the energy that was used for heating the part of the waste fluid which is exhausted is wasted. In addition, the turbine that is used to remove the excessive waste fluid from the flow duct of the gas turbine engine works with the heated waste fluid (at about 700° C.). The turbine used for removing the waste fluid, which is an auxiliary turbine, has to be manufactured to withstand this temperature, which requires exacting manufacturing tolerances and the use of special materials. These auxiliary turbines have a high cost and limited reliability.

Another disadvantage of the prior art is that combustion air is supplied to the combustor by an auxiliary compressor which is driven by the same auxiliary turbine that is used to remove the excessive waste fluid from the engine flow duct. This is rather ineffective, especially under transient conditions, because the auxiliary compressor capacity fully depends on the power of the auxiliary turbine, which power, in turn, is determined by the amount of the waste fluid exhausted through the auxiliary turbine into the atmosphere. The amount of the waste fluid exhausted into the atmosphere is determined by a complicated control system, and there is no direct relationship between the pressure (fluid density) in the gas turbine engine flow duct and the amount of waste fluid that is exhausted, hence the amount of combustion air which is supplied to the combustor. Because there is no direct relationship between the waste fluid removal system and the control parameters of the power turbine and of the compressor turbine and there are present substantial gas paths with high thermodynamic inertia upstream of the waste fluid removal system, the waste fluid removal and combustion air supply system respond slowly, which results in the gas turbine engine operating sluggishly under transient conditions.

The prior art system requires a special control subsystem with sensors and control elements for transition to idling. This makes the control system of the engine more complicated.

It is thus an object of the invention to avoid this complicated form of control system.

It is also an object of the invention to provide a gas turbine engine having a greater efficiency.

Another object of the invention is to provide a gas turbine engine which has a faster response over the full power range.

Further object of the invention is to provide a gas turbine engine which is simpler and more reliable in operation.

SUMMARY OF THE INVENTION

The above and other objects are accomplished by providing a gas turbine engine having a compressor unit that has two inlets and two outlets, one outlet of which communicates with the atmosphere. The gas turbine engine has a power turbine and a counter-rotating compressor turbine for powering the compressor unit. A control device controls temperature at the compressor turbine outlet. The compressor turbine outlet is connected via a heat exchanger to one inlet of the compressor unit and compresses waste fluid which is fed from one outlet of the compressor unit through a heat exchanger to a first flow control connected to one inlet of a mixer. The second inlet of the compressor unit communicates with the atmosphere. Compressed air is supplied from the second outlet of the compressor unit to a second inlet of the mixer through a second flow control. The mixer is connected to a combustor for supplying heated fluid to the power turbine and compressor turbine.

Other objects and advantages of the invention will become apparent from the following description of preferred embodiments thereof with the reference to the accompanying drawings.

DETAILED DESCRIPTION OF THE DRAWINGS

Figure 1:
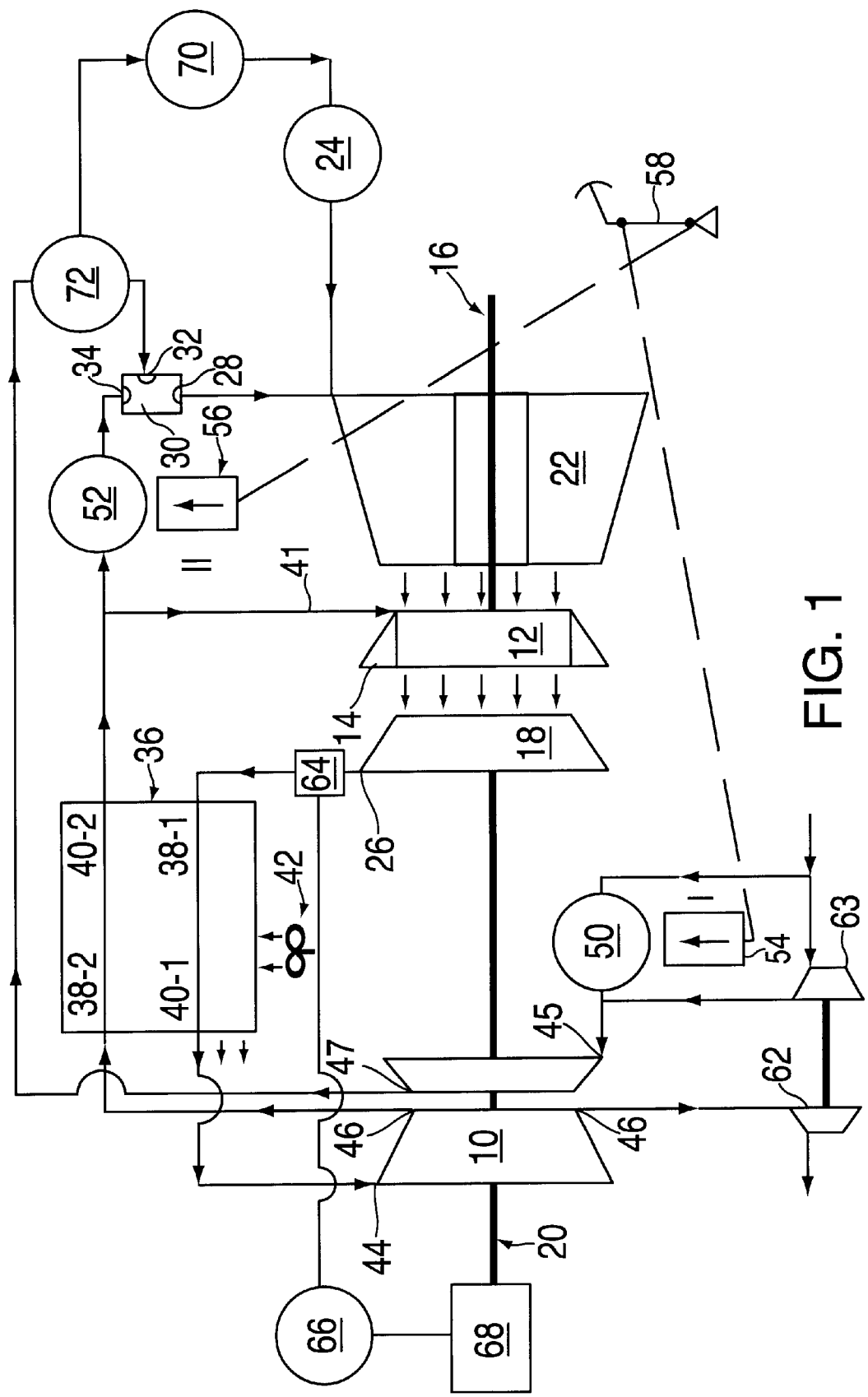
FIG. 1 is a diagrammatic view of a gas turbine engine embodying the principle of the present invention.

In FIG. 1, a gas turbine engine according to the invention has a compressor 10 and a power turbine 12, which has blades 14 and which is installed on a shaft 16. A compressor turbine 18 is used to power compressor 10 and is installed on a shaft 20 downstream of power turbine 12 to rotate in a direction opposite to the direction of rotation of power turbine 12. Such turbines are known to those skilled in the art as counter-rotating turbines. A combustor 22 is provided upstream of power turbine 12. Combustor 22 provides a heated fluid as a result of fuel burning which is fed to combustor 22 from a fuel source 24. The heated fluid expands through blades 14 of power turbine 12, as a result of which power turbine 12 generates the mechanical energy to work against a load. The heated fluid then enters compressor turbine 18 which powers compressor 10 which is installed on the same shaft 20. Compressor turbine 18 has an outlet 26 to discharge a waste fluid from compressor turbine 18. The heated fluid source is connected to an outlet 28 of a mixer 30, which is designed to prepare a mixture of waste fluid and combustion air and to feed this mixture to combustor 22. Mixer 30 has a first inlet 32 and a second inlet 34.

A heat exchanger 36 has at least two inlets—a first inlet 38-1 and a second inlet 38-2—and at least two outlets—a first outlet 40-1 and a second outlet 40-2. A cooling fan 42 provides additional cooling of the core of heat exchanger 36. Although the heat exchanger 36 is shown as an assembly having two inlets and two outlets, it is understood that it may have more independent circuits to assure the heat exchange needs of various subsystems of the gas turbine engine. A detailed construction of the heat exchanger does not have a material bearing on this invention.

Compressor 10 has a first inlet 44, a second inlet 45, a first outlet 46 communicating with the atmosphere, and a second outlet 47. First inlet 44 of compressor 10 is connected to first outlet 40-1 of heat exchanger 36, and first inlet 38-1 of heat exchanger 36 is connected to outlet 26 of compressor turbine 18. As a result, the waste fluid flow from outlet 26 of compressor turbine 18 passes through heat exchanger 36 and enters first inlet 44 of compressor 10 through outlet 40-1 of heat exchanger 36 and is compressed in compressor 10. The waste fluid flow that exits compressor 10 at first outlet 46 after being compressed passes through heat exchanger 36 to second outlet 40-2 and cools the waste fluid flow that passes through the heat exchanger from inlet 38-1 to outlet 40-1. The heat taken from the waste fluid flow that exits outlet 26 is used to heat the compressed waste fluid flow that passes from compressor 10 to outlet 40-2 of heat exchanger 36. A part of the heated compressed fluid flow from the outlet 40-2 of heat exchanger 36 may be diverted through a line 41 to blades 14 of power turbine 12 for cooling blades 14 and other power turbine components. This cooling arrangement is not described in detail here because it does not have material bearing on the present invention.

A first flow control 50 is connected to second inlet 45 of compressor 10 and is used to meter combustion air into mixer 30. First flow control 50 communicates directly with the atmosphere. A second flow control 52 is connected between second outlet 40-2 of heat exchanger 36 and second inlet 34 of mixer 30. Second flow control 52 meters the heated compressed waste fluid to mixer 30 that is used to prepare a mixture of the waste fluid and combustion air, which mixture is then fed from outlet 28 of mixer 30 to combustor 22. This mixture is then mixed with the fuel fed to the combustor from source of fuel 24. Flow controls 50 and 52 may be throttle valves that are mechanically controlled to change the cross-sectional area for the flow, or electromagnetically or hydraulically controlled valves.

First flow control 50 is connected to a first control member 54 which imparts a first movement I to first flow control 50, and second flow control 52 is connected to a second control member 56, which imparts a second movement II to second flow control 52. A control actuator 58 acts upon control members 54 and 56 in such a manner that the second movement II is in advance of the first movement I, as will be explained in detail below.

Those skilled in the art will understand that when the air flow fed to mixer 30, and hence to combustor 22, increases, the quantity of fuel fed from fuel source 24 to combustor 22 also increases, and a respective quantity of waste fluid must be removed from the gas turbine engine flow duct under steady conditions. In order to accomplish this, first outlet 46 of compressor 10 for the waste fluid communicates with the atmosphere.

First outlet 46 of compressor 10 may be open to the atmosphere, or first outlet 46 may communicate with the atmosphere through a pressure booster, which can be a booster compressor 62. Booster compressor 62 is mechanically coupled to a booster compressor turbine 63, which may be mounted on the shaft of booster compressor 62 to power it. Alternatively, booster compressor 62 can be powered by any other appropriate known means. The use of booster compressor turbine 63 allows the air pressure at second inlet 45 of compressor 10 to be reduced below atmospheric pressure. This is necessary in order to obtain a pressure at second outlet 47 of compressor 10 that is equal to the pressure at first outlet 46 of compressor 10, which pressure is below the atmospheric pressure. In addition, when the air from the atmosphere expands in the turbine, the air temperature decreases, lowering the work of compression. At the same time, expanding air in booster compressor turbine 63 produces the energy for powering booster compressor 62, so the energy released to expand the air and to lower the air pressure is not lost.

The gas turbine engine has a temperature sensor 64 for monitoring the temperature of the waste fluid discharged from compressor turbine 18. Sensor 64 is connected to a temperature control module 66, which controls the load (not shown) on an electric generator 68. Electric generator 68 is mechanically coupled to compressor 10 (in this embodiment, electric generator 68 is mounted on shaft 20 of compressor turbine 18, but it can be coupled to this shaft through a gearbox.) The system consisting of temperature sensor 64, temperature control module 66, and electric generator 68 and its load (not shown) keeps constant the waste fluid temperature at outlet 26 of compressor turbine 18.

Fuel supplied from fuel source 24 to combustor 22 is controlled by a fuel control module 70, which receives a signal from an air flow sensor 72 installed at first inlet 32 of mixer 30 to meter the fuel from fuel source 24 in accordance with the amount of air that enters mixer 30 and then combustor 22. The system consisting of the air flow sensor 72 and the fuel control module 70 is well known in the art of motor vehicles with direct fuel injection and is not described herein in detail.

Figure 2:
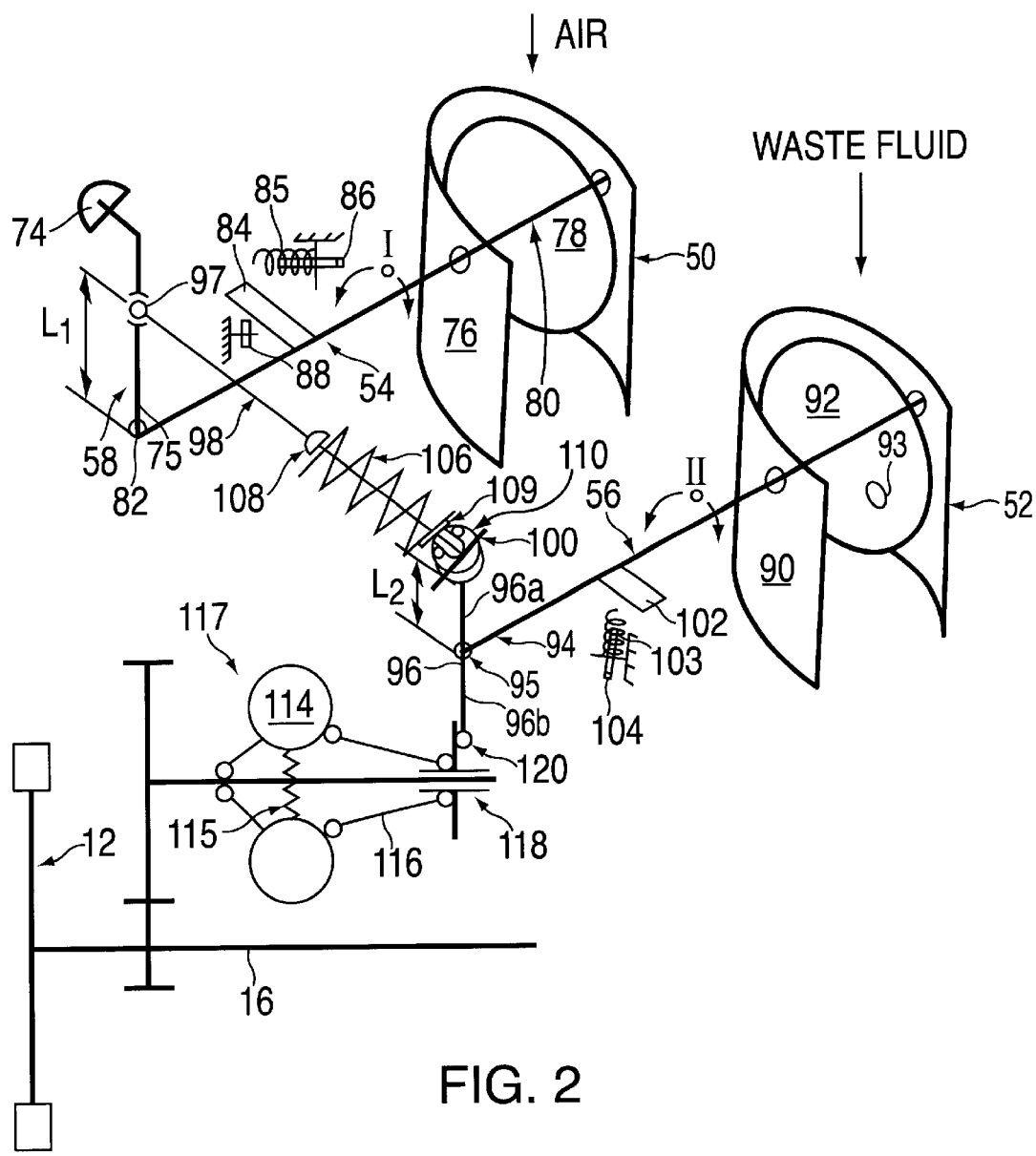
FIG. 2 is a schematic illustration of an embodiment of a control system for the gas turbine engine according to the invention.

FIG. 2 shows a more detailed schematic view of a control system that is used to control the mixing of waste fluid and combustion air in mixer 30 (FIG. 1). Similar components are shown in FIG. 2 using the same reference numerals as in FIG. 1.

Control actuator 58 has a pedal 74 which is used in a manner similar to a motor vehicle accelerator or gas pedal. It is designed to control gas turbine engine power (and speed) for the range of operating conditions. First flow control 50 has a flow duct 76, which connects first inlet 32 of mixer 30 to a source of combustion air (the atmosphere or source of air under pressure 51 in FIG. 1). A throttle valve 78 is installed in duct 76 and rotates on a shaft 80, which has its centerline extending in the diametrical plane of the cross-section of duct 76. Shaft 80 is connected to an arm 75 of pedal 74 at location 82 and has a lug 84, the end of which is engageable with stops 86 and 88 to limit the movement I of throttle valve 78 in both directions. Stop 88 determines the minimum amount of throttle valve 78 opening for no-load operation. Stop 86 determines the maximum amount of the throttle valve 78 opening. A return spring 85 installed between stop 86 and lug 84 is used to return throttle valve 78 to the initial minimum opening position when pedal 74 is released.

Second flow control 52 has a flow duct 90 that connects second outlet 40-2 of heat exchanger 36 to second inlet 34 of mixer 30 to meter the heated compressed waste fluid flow to mixer 30 for mixing with combustion air. A throttle valve 92 is installed in duct 90 and rotates on a shaft 94, which has its centerline extending in the diametrical plane of the cross-section of duct 90. Shaft 94 is connected at location 95 to a double arm lever 96 having one arm 96a that has a pivot 100 at its distal end. A linkage 98 pivotally connected to arm 75 of pedal 74 at location 97 extends through the pivot 100. Shaft 94 has a lug 102 which is engageable with a stop 104 for limiting the movement II of throttle valve 92. Stop 104 limits the maximum movement of throttle valve 92, and a return spring 103 is used to return throttle valve 92 to the initial position when pedal 74 is released. A return spring 106 is installed on linkage 98. Return spring 106 is installed between a plate 108 secured to linkage 98, which may be made as a nut for adjustment (not shown) and a plate 109 that bears against pivot 100. A retaining ring 110 is installed at the free end of linkage 98 and bears against pivot 100 on the opposite side. The length L1 of arm 75 of pedal 74, which controls shaft 80 rotation, is more than twice as large as the length L2 of arm 96. With this arrangement, the movement II of throttle valve 92, which movement is used to control the flow of the waste fluid to the mixer 30 (FIG. 1) will occur ahead of the movement I of the throttle valve 78, which movement is used to control the flow of combustion air to mixer 30. This means that when throttle valve 92 for the waste fluid is fully opened, throttle valve 78 for combustion air will be opened only about half. The approximate 1:2 ratio of air-to-waste fluid flows which is disclosed here may be adjusted by varying the ratio of the lengths of arms 75 and 96a using any appropriate known adjusting mechanism not shown here. Throttle valve 92 has an opening 93 which is used to provide a constant flow of the waste fluid to mixer 30 and to combustor 22 when throttle valve 92 is closed (during the starting and at no-load). This means that during the starting and idling of the engine, the ratio of air to the ballast gas will be approximately 1:1.

A speed sensor such as a centrifugal governor 117 is installed on shaft 16 of power turbine 12 to monitor the speed of power turbine 12. Centrifugal governor 117 has flyweights 114 with a return spring 115. Flyweights 114 have levers 116 engageable with a slider 118, which is connected to second arm 96b of double-arm lever 96 of shaft 94 that controls throttle valve 92 for waste fluid control 52. Arm 96b is connected to slider 118 by a pivot 120.

When the gas turbine engine is started, compressor 10 (powered by a starter that is not shown) creates a pressure of air at outlets 46 and 47 that is transmitted to combustor 22. At the same time, the pressure downstream of compressor turbine 18 decreases. The pressure reduction at second inlet 45 of compressor 10 causes booster compressor turbine 63 to rotate and to power booster compressor 62 which will start removing a part of the fluid from the gas turbine engine flow duct. An igniter (not shown) is then energized. Fuel is supplied to the combustor from fuel source 24. Fuel starts burning in combustor 22, and the heated fluid (combustion products) formed as a result of this burning is fed to power turbine 12 and to compressor turbine 18. The waste fluid from the outlet 26 of compressor turbine 18 passes through heat exchanger 36 (first inlet 38-1 and first outlet 40-1) in which it is cooled and is admitted to compressor 10 at first inlet 44 to be compressed. The compressed waste fluid then exits second outlet 40-2 of the heat exchanger and is heated by the waste fluid that exits outlet 26 of compressor turbine 18. The waste fluid from second outlet 40-2 of heat exchanger 36 passes through duct 90 (FIG. 2) and through opening 93 because throttle valve 92 is not yet opened. Instead, the lost movement is taken up by compressing spring 106 on linkage 98. Slider 118 holds lever 96 stationary as power turbine 12 does not rotate, and flyweights 114 do not cause slider 118 to move. Shaft 94 cannot be turned as pivot 120 bears against stationary slider 118, whereby throttle valve 92 for the waste fluid remains closed.

When the engine is started, power turbine 12 begins to rotate, and its speed increases. This speed increase results in flyweights 114 moving under the action of the centrifugal force and expanding spring 115. This movement of flyweights 114 causes slider 118 to move to the left in FIG. 2, whereby throttle valve 92 can move. Accordingly, the gas turbine engine runs at idle.

When pedal 74 is pressed, arm 75 turns shaft 80 to start opening throttle valve 78 for supplying combustion air. Linkage 98 moves to the left in FIG. 2 with spring 106, and plate 109 pushes pivot 100 to turn shaft 94 and to start opening throttle valve 92 for the waste fluid. As throttle valve 78 is opened, air from the atmosphere (FIG. 1) starts bypassing booster turbine 63. As a result, the speed of booster turbine 63 decreases, and the power of booster compressor 62 also decreases. This causes a reduction in the amount of the waste fluid that is removed from outlet 46 of the compressor 10 into the atmosphere. The density (pressure) of the fluid in the gas turbine engine flow duct increases, and power turbine 12 starts accelerating.

When power turbine 12 starts rotating, compressor turbine 18 receives less power with the same fuel supply, and waste fluid flow decreases, so the waste fluid flow to mixer 30 will remain about the same as it was during starting (i.e., the air-to-waste fluid ratio will be about 1:1).

When pedal 74 is depressed further, shaft 80 will be rotated further by arm 75 to move throttle valve 78 for combustion air to enlarge its opening and to supply more air to mixer 30. This action will also increase the amount of fuel metered to combustor 22 from fuel source 24 because of signals fuel control module 70 receives from air flow sensor 72. Compressed spring 106 will push pivot 100 and arm 96a of double-arm lever 96 further to the right in FIG. 2 to rotate shaft 94 and increase the amount of opening of throttle valve 92 for the waste fluid. As power turbine 12 speed increases, flyweights 114 of centrifugal governor 117 move apart and cause slider 118 to move to the left in FIG. 2 so that lever 96 is free to move under the action of linkage 98. As the ratio of the lengths of arm 75 and arm 96a (L1/L2) is about 1:2, throttle valve 92 for waste fluid will open about twice as fast as throttle valve 78 for combustion air, so the air-to-waste fluid flow ratio will change from about 1:1 at the beginning of the acceleration period to about 1:2 when the engine gains full speed.

When the gas turbine engine load increases to such an extent that the speed of power turbine 12 decreases, and a part of the fluid flow energy goes to compressor turbine 18 to increase its power so that compressor 10 starts working harder, waste fluid flow increases. This results in the heated fluid temperature decreasing at the outlet of combustor 22, and the temperature of the waste fluid at outlet 26 of compressor turbine 18 also decreases. Temperature sensor 64 signals this decrease to temperature control module 66, which triggers electric generator 68 to increase the load on shaft 20 of compressor turbine 18, and compressor 10 will consequently supply a lower quantity of waste fluid. At the same time, the waste fluid quantity from compressor 10 will still be greater than needed for normal combustion. At the same time, as the speed of power turbine 12 decreases, spring 115 will return flyweights 114 of centrifugal governor 117, and slider 118 will move to the right in FIG. 2 to turn throttle valve 92 through shaft 94 and to reduce the waste fluid quantity that enters mixer 30. This will restore the balance among the amounts of combustion air, fuel and waste fluid admitted to combustor 22.

During the gas turbine engine operation, a part of the waste fluid is removed from the flow duct by discharging it from outlet 46 of compressor 10. This is necessary to replace a part of the waste fluid with combustion air in order to sustain combustion in combustor 22. When the pressure at outlet 46 of compressor 10 reaches below atmospheric pressure (which is the case at up to 30%–40% of the rated power), the removal of the waste fluid is carried out by means of booster compressor 62.

Booster compressor 62 is automatically activated when pedal 74 is released, and throttle valve 78 is closed. This closes the bypass path from the atmosphere through flow control 50, and booster compressor turbine 63 starts rotating to power booster compressor 62. The engine runs idle.

Figure 3:
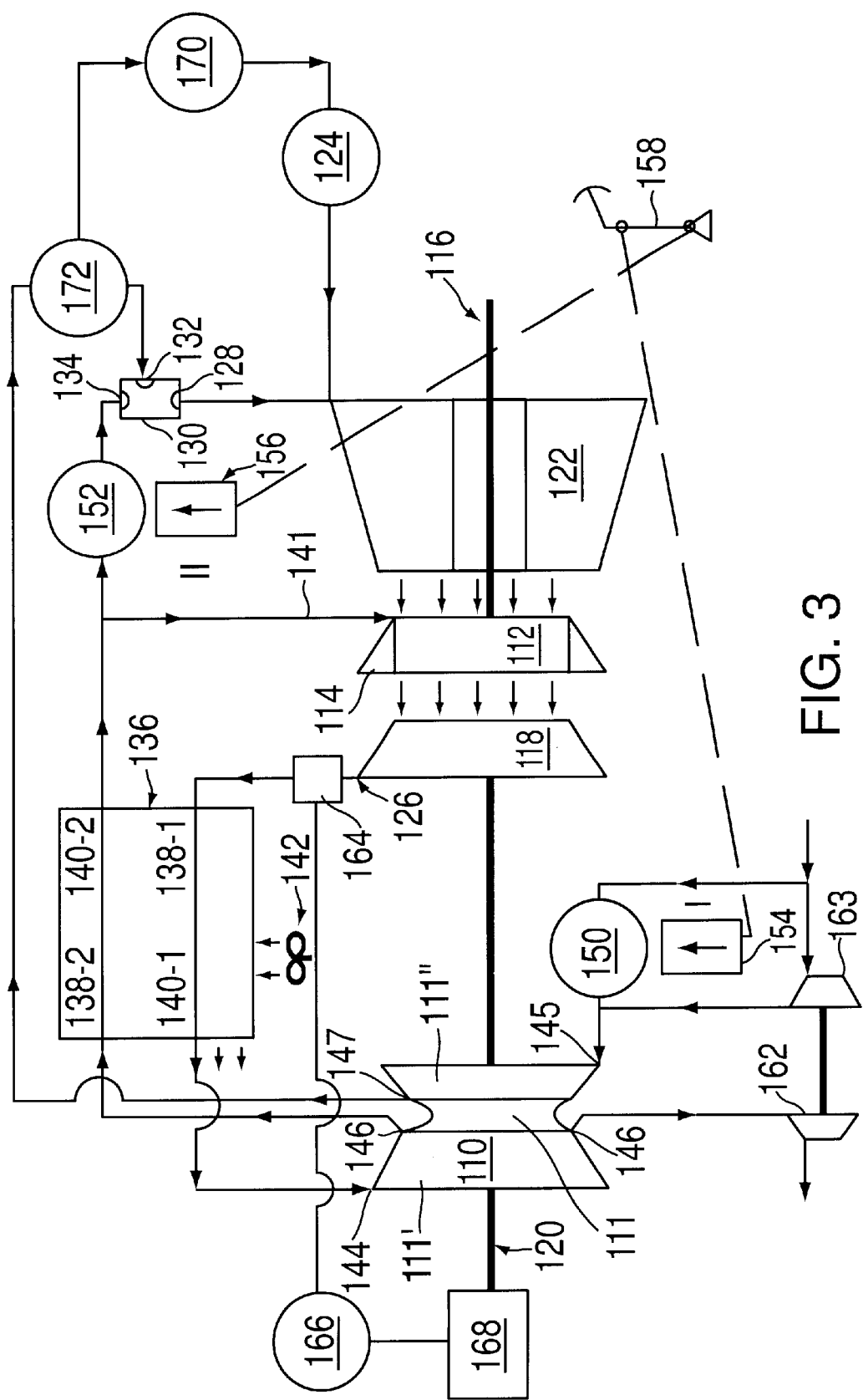
FIG. 3 is another embodiment of a gas turbine engine according to the invention, having a double-entry compressor.

In the description given above, it was assumed that the compressor has two inlets 44 and 45, and two outlets 46 and 47. As can be seen from the drawing (FIG. 1), these inlets and outlets are shown schematically as associated with two different compressor rotors. It will be understood that the practical solution would involve the use of a double-entry compressor of the type shown in FIG. 3 in which similar parts are shown at the same reference numerals with the addition of 100. The compressor, which is generally shown at 110, has a rotor 111 installed on a shaft 120. Rotor 111 has two sides: 111' and 111". First side 111' of rotor 111 has an inlet 144 and an outlet 146. Second side 111" of rotor 111 has an inlet 145 and an outlet 147. It is understood that the double-entry compressor may have more than one outlet on each side of rotor 111 if it is necessary to supply fluid separately to other gas turbine engine subsystems.

Figure 4:
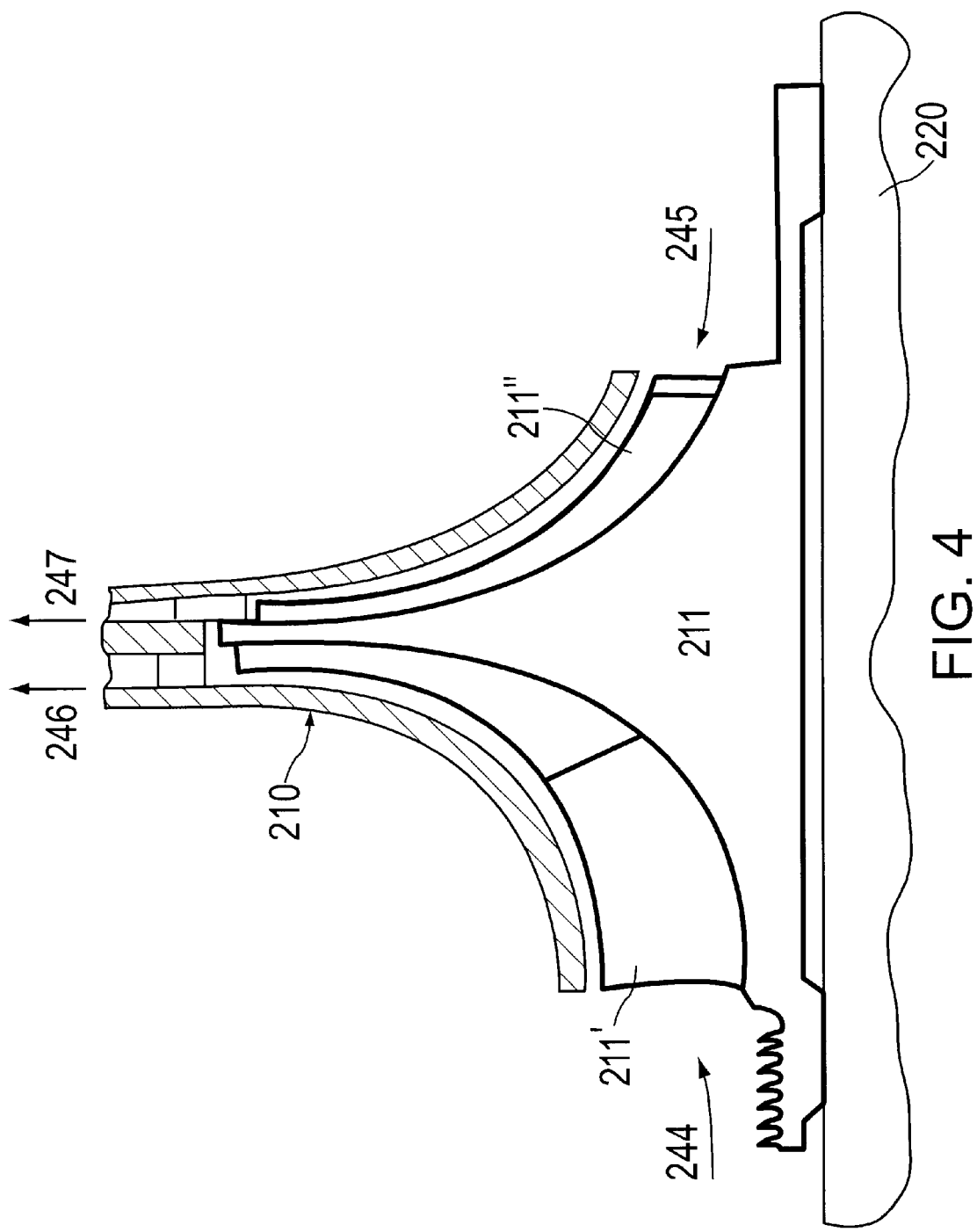
FIG. 4 is a schematic view of a double-entry compressor used in the gas turbine engine according to the invention.
Figure 5:
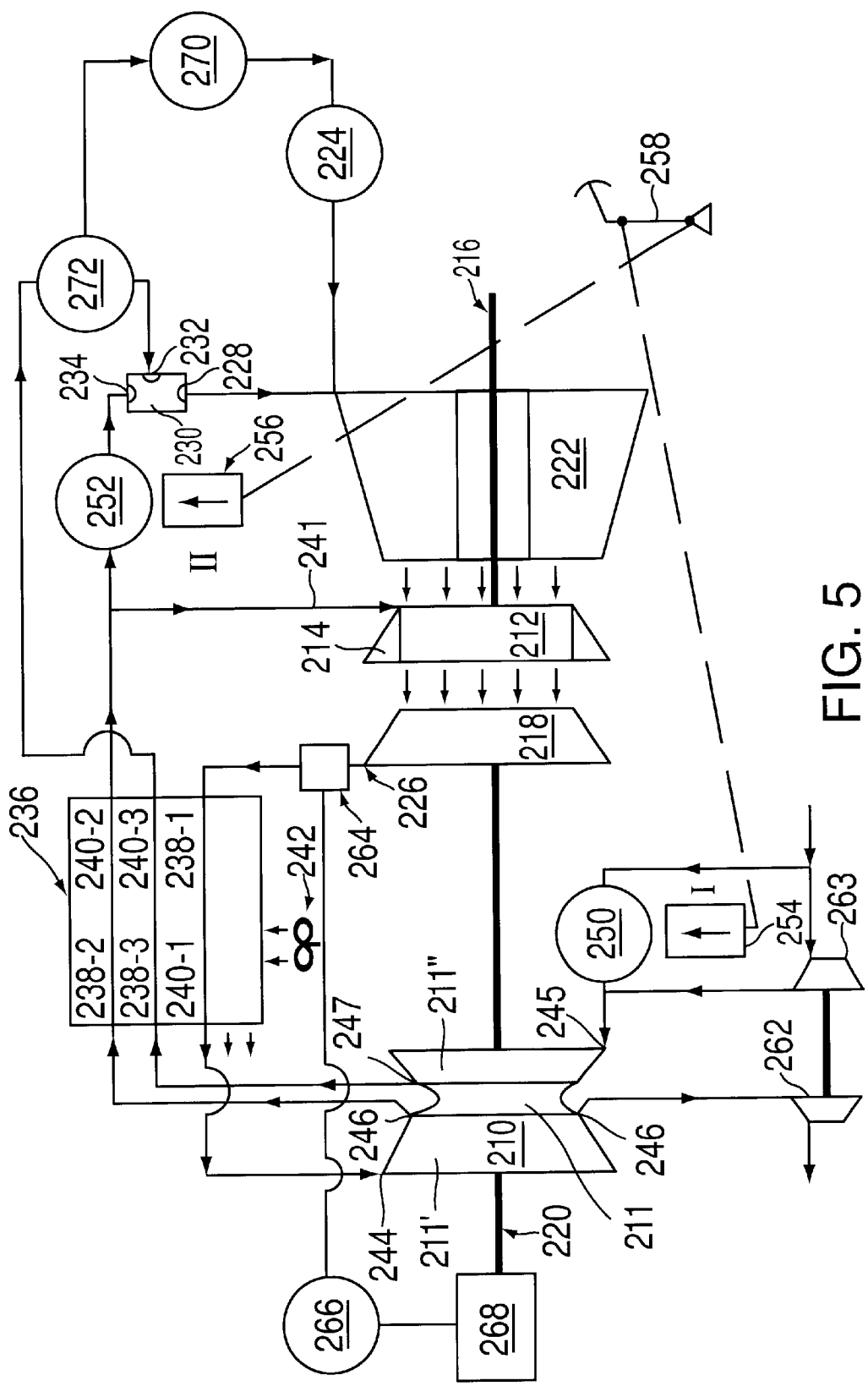
FIG. 5 is another embodiment of the gas turbine engine shown in FIG. 1.

In the embodiment shown in FIG. 4 and FIG. 5 similar parts are shown at the same reference numerals with the addition of 200.

In the embodiment shown in FIG. 5, the gas turbine engine is constructed basically along the same lines as described above. The main difference in this embodiment is that the combustion air from an outlet 247 of a compressor 210 passes through a heat exchanger 236 for heating the combustion air before it enters mixer 230. The use of heated combustion air increases the gas turbine engine efficiency. In order to do this, heat exchanger 236 has a third inlet 238-3 which is connected to a second outlet 247 of compressor 210 and a third outlet 240-3 which is connected to a first inlet 234 of mixer 230. With this arrangement, the combustion air, which is compressed in compressor 210, is heated in heat exchanger 236 with the heat of the waste fluid that exits outlet 226 of compressor turbine 218 (inlet 238-1 and outlet 240-1 of heat exchanger 236). For the rest, the construction and operation of the gas turbine engine in the embodiment of FIG. 5 is the same as described with reference to FIGS. 1 and 2.

It can be seen from the above description of the invention that the gas turbine engine according to the invention has a faster response because there is a direct relationship between the pressure within the gas turbine engine flow duct and the change in the supply of combustion air to the combustor and excessive waste fluid removed from the gas turbine engine flow duct. The engine response is also improved because the supply of combustion air is carried out by the compressor, which is powered by the compressor turbine. This arrangement does not impose any limits on the amount of additional air flow rate that can be supplied immediately to the combustor because the power supplied by the compressor turbine is much greater than the relatively small power needed to ensure the supply of combustion air to the combustor. The efficiency of the gas turbine engine is substantially improved as the excessive waste fluid is removed from the engine flow duct before the waste fluid is heated in the heat exchanger. In addition, the waste fluid is not used for assuring the supply of air to the combustor. This allows the heat exchanger to be made smaller, or the heat exchanger can be made more efficient at the same size. The use of the booster compressor turbine for powering the booster compressor with a bypass line allows for automatic transition to the idling mode without a complicated control system. This booster compressor turbine also expands the air before feeding it to the compressor to reduce the air pressure and to make it compatible with the pressure in the gas turbine engine flow duct. The booster compressor used to remove the waste fluid from the gas turbine engine flow duct works with gas that has a temperature of about 75° C., so no special requirements are needed for the manufacture of this booster compressor. The turbine for expanding combustion air works with the air at an ambient temperature. All this makes the gas turbine engine simpler and less expensive than the prior art.

Various modifications and additions may be made to the embodiments described above without going beyond the spirit and scope of the present invention as defined in the attached claims. Thus the heat exchanger may have an additional cooling stage for cooling the waste fluid that goes to the compressor. The gas turbine engine may have a special device for heating fuel before feeding it to the combustor.

I claim:

1. A gas turbine engine comprising:
    a fluid compressor having a first inlet and a second inlet, a first outlet which communicates with the atmosphere and a second outlet;
    a power turbine, said power turbine being mounted downstream of said fluid compressor;
    a fluid compression turbine for powering said fluid compressor mounted downstream of said power turbine to rotate in a direction opposite to the rotation direction of said power turbine, said fluid compression turbine having an outlet for discharging waste fluid, said waste fluid having a temperature;
    a heated fluid source upstream of said power turbine;
    a fuel source connected to said heated fluid source;
    a heat exchanger having at least a first inlet and a second inlet and at least a first outlet and a second outlet;
    said fluid compressor first inlet being connected to said heat exchanger first outlet;
    said fluid compressor second inlet communicating with the atmosphere;
    said heat exchanger first inlet being connected to said fluid compression turbine outlet;
    said heat exchanger second inlet being connected to said fluid compressor first outlet;
    a mixer for preparing a mixture of said waste fluid and said combustion air, said mixer having an outlet connected to said heated fluid source, a first inlet, and a second inlet;
    said mixer first inlet being connected to said fluid compressor second outlet;
    said mixer second inlet being connected to said heat exchanger second outlet;
    a means for controlling the temperature of said waste fluid;
    a first flow control means upstream of said fluid compressor second inlet;
    a second flow control means between said heat exchanger second outlet and said mixer.

2. The gas turbine engine of claim 1 wherein said heat exchanger has a third inlet connected to said fluid compressor second outlet and a third outlet connected to said mixer first inlet.

3. The gas turbine engine of claim 1 further comprising a pressure booster having an inlet communicating with said fluid compressor first outlet and an outlet communicating with the atmosphere.

4. The gas turbine engine of claim 3 wherein said heat exchanger has a third inlet connected to said fluid compressor second outlet and a third outlet which is connected to said mixer first inlet.

5. The gas turbine engine of claim 1, further comprising:
    a booster compressor, said booster compressor having an inlet connected to said fluid compressor first outlet and an outlet communicating with the atmosphere;
    a booster compressor turbine which is mechanically coupled to said booster compressor, said booster compressor turbine having an inlet and an outlet, said booster compressor turbine inlet communicating with atmosphere, said booster compressor turbine outlet communicating with said fluid compressor second inlet; and
    said first flow control means being connected between said booster compressor turbine inlet and said fluid compressor second inlet.

6. The gas turbine engine of claim 5 wherein said heat exchanger has a third inlet connected to said fluid compressor second outlet and a third outlet which is connected to said mixer first inlet.

7. The gas turbine engine of claim 1, wherein said fluid compressor further comprises a double-entry compressor having a rotor with a first side and second side;
    said rotor first side having an inlet and at least one outlet, said rotor second side having one inlet and at least one outlet;
    said rotor first side inlet being connected to said heat exchanger first outlet and one of said at least one outlet of said rotor first side being connected to said heat exchanger second inlet and communicating with the atmosphere;
    said rotor second side inlet communicating with the atmosphere and one of said at least one outlet of said rotor second side being connected to said mixer first inlet.

8. The gas turbine engine of claim 6, wherein said heat exchanger has a third inlet connected to said rotor second side outlet and a third outlet which is connected to said mixer first inlet.

9. The gas turbine engine of claim 7, wherein said gas turbine engine further comprises a pressure booster having an inlet communicating with one of said fluid compressor first outlet and an outlet communicating with the atmosphere.

10. The gas turbine engine of claim 9, wherein said heat exchanger has a third inlet connected to said rotor second side outlet and a third outlet which is connected to said mixer first inlet.

11. A gas turbine engine comprising:
    a double-entry compressor, said double-entry compressor having a first side and a second side;
    said double-entry compressor first side having an inlet and at least one outlet, and said double-entry compressor second side having a first inlet and at least one outlet;
    a power turbine, said power turbine being mounted downstream of said double-entry compressor;
    a compressor turbine for powering said double-entry compressor, said compressor turbine being mounted downstream of said power turbine for rotation in a direction opposite to the rotation direction of said power turbine, said compressor turbine having an outlet for discharging waste fluid, said waste fluid which has a temperature;

a heated fluid source provided upstream of said power turbine;

a fuel source connected to said heated fluid source;

a heat exchanger having at least a first inlet and a second inlet and at least a first outlet and a second outlet;

said heat exchanger first inlet being connected to said compressor turbine outlet;

said heat exchanger second inlet being connected to said at least one outlet of said double-entry compressor first side;

said double-entry compressor first side first inlet being connected to said heat exchanger first outlet;

said double-entry compressor second side inlet communicating with the atmosphere;

a mixer for preparing a mixture of said waste fluid and said combustion air, said mixer having an outlet connected to said heated fluid source, a first inlet, and a second inlet;

said mixer first inlet being connected to said at least one outlet of said double-entry compressor second side;

said mixer second inlet being connected to said heat exchanger second outlet;

a means for controlling the temperature of said waste fluid;

a first flow control means, said first flow control means being provided upstream said double-entry compressor second side inlet;

a second flow control means, said second flow control means being provided between said heat exchanger second outlet and said mixer;

a booster compressor having an inlet connected to said double-entry compressor first side outlet and an outlet communicating with the atmosphere; and a booster compressor turbine mechanically coupled to said booster compressor, having an inlet and an outlet, said booster compressor turbine inlet communicating with atmosphere, and said booster compressor turbine outlet communicating with said double-entry compressor second side inlet, said first flow control means being connected between said booster compressor turbine inlet and said double-entry compressor second side inlet.

12. The gas turbine engine of claim 11, wherein said heat exchanger has a third inlet connected to said rotor second side outlet and a third outlet which is connected to said mixer first inlet.

* * * * *